United States Patent [19]

Henmi et al.

[11] Patent Number: 4,774,698

[45] Date of Patent: Sep. 27, 1988

[54] OPTICAL DISC RECORDING AND REPRODUCING APPARATUS WITH IMPROVED SERVO CONTROL

[75] Inventors: Fumiaki Henmi; Tamotsu Yamagami, both of Tokyo, Japan

[73] Assignee: Sony Corporation, Tokyo, Japan

[21] Appl. No.: 919,145

[22] PCT Filed: Dec. 5, 1985

[86] PCT No.: PCT/JP85/00668

§ 371 Date: Sep. 8, 1986

§ 102(e) Date: Sep. 8, 1986

[87] PCT Pub. No.: WO86/04446

PCT Pub. Date: Jul. 31, 1986

[30] Foreign Application Priority Data

Jan. 29, 1985 [JP] Japan ................... 60-14991

[51] Int. Cl.[4] ............ G11B 7/095; G11B 11/00
[52] U.S. Cl. .................... 369/13; 369/44; 369/45; 369/46; 369/54; 369/59
[58] Field of Search ............ 369/13, 44, 45, 46, 369/54, 59, 106, 116

[56] References Cited

U.S. PATENT DOCUMENTS

| 4,607,157 | 8/1986 | Millar et al. | 369/45 |
| 4,627,040 | 12/1986 | Arai et al. | 369/46 |
| 4,661,942 | 4/1987 | Yoshimoto et al. | 369/46 |

FOREIGN PATENT DOCUMENTS

| 0035236 | 9/1981 | European Pat. Off. |
| 0078673 | 5/1983 | European Pat. Off. |
| 59-157877 | 9/1984 | Japan |

Primary Examiner—Raymond F. Cardillo
Assistant Examiner—Hoa T. Nguyen
Attorney, Agent, or Firm—Hill, Van Santen, Steadman & Simpson

[57] ABSTRACT

An optical disc recording and reproducing apparatus incorporates apparatus for recording a modulated signal on an optical disc, using a laser beam, and apparatus for optically reading a signal recorded on the disc. In both recording and reproducing modes, an optical signal is produced from the disc and used to supply a control signal to a servo system, for controlling the position of the laser beam relative to the optical disc. Apparatus is provided for subtracting, from the servo control signal, the low frequency components in the modulated signal being recorded on the disc, to improve the accuracy of focus and tracking of the laser beam relative to the optical disc.

5 Claims, 1 Drawing Sheet

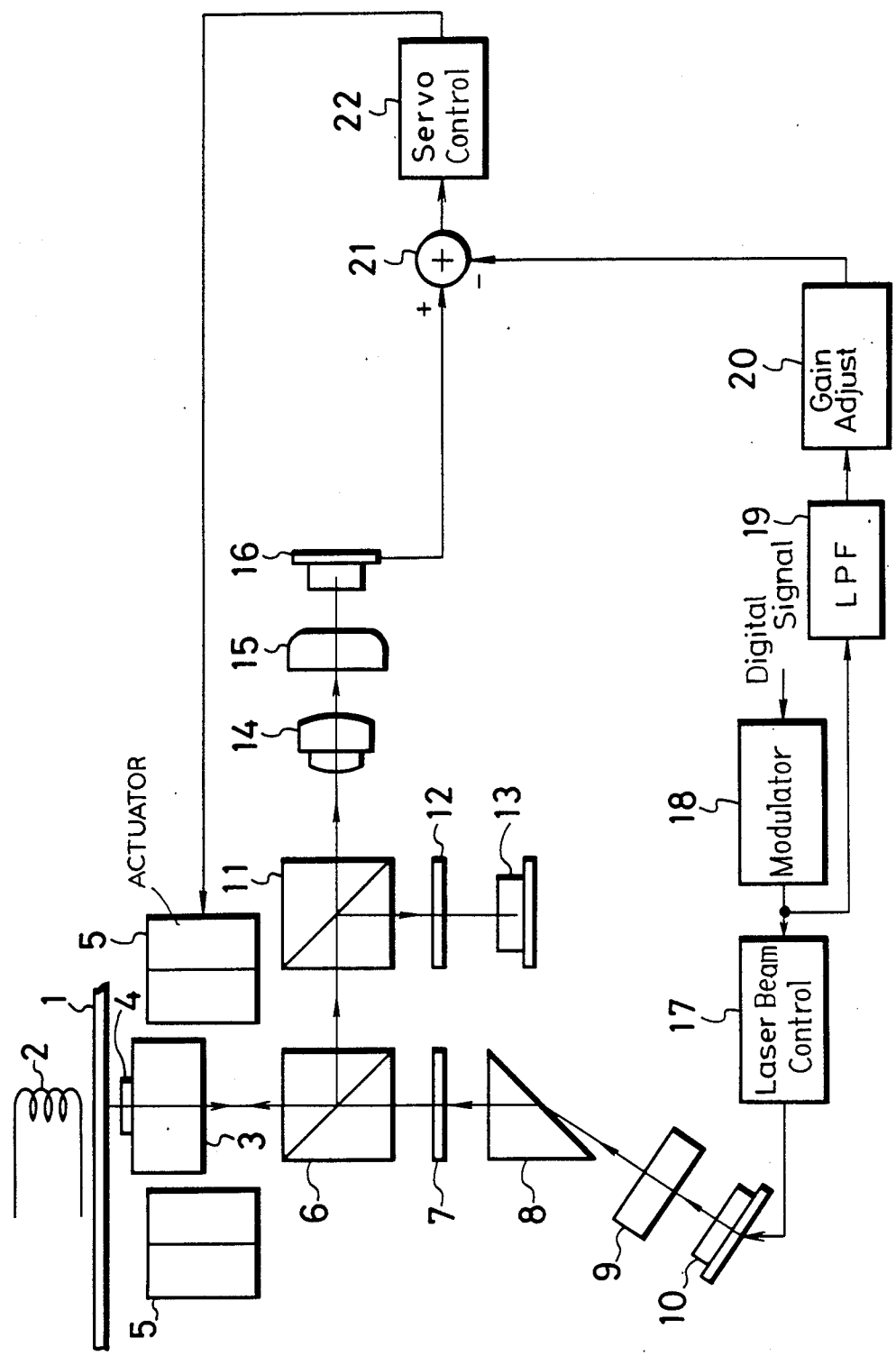

OPTICAL DISC RECORDING AND REPRODUCING APPARATUS WITH IMPROVED SERVO CONTROL

TECHNICAL FIELD

This invention relates to an optical disc recording and reproducing apparatus suitable for recording a digital signal and reproducing the same.

BACKGROUND ART

Recently, there has been developed and commercialized so far such an apparatus which employs an optical disc (Writable disc or DRAW) on which a digital data can be recorded one time and an optical disc (optical magnetic recording disc or the like) from which a digital data can be erased as an external storage or to record other digital data.

By the way, when such apparatus is developed and commercialized, a digital conversion system (Channel Modulation) to substantially convert a digital data to a recorded pattern on the disc becomes a serious problem. The digital modulation is a system to convert a raw data series to a certain data which can be matched with characteristics of media (discs). One of the necessary conditions in this system is that an energy of a servo frequency band in a low frequency range has to be small within a spectrum of a modulation signal. If the energy of the servo frequency band in the low frequency range is high, it affects a servo loop as an external disturbance, obstructing a servo from being effected accurately as it is expected. This condition is also taken into consideration for a disc such as a compact disc that is used only for the playback. Particularly, in the case of a recordable disc apparatus, upon recording, a laser light source must be driven by a modulation signal so that in the modulation system with much low frequency components, an energy applied as an external disturbance becomes rather large to disturb very much the servo from being carried out precisely.

In view of such aspect, this invention is made and provides an optical disc recording and reproducing apparatus by which even in a modulation system in which an energy of a low frequency component is relatively large, a focusing servo and a tracking servo can be stably carried out in the recording mode.

DISCLOSURE OF INVENTION

An optical disc recording and reproducing apparatus according to this invention is constructed such that upon recording, an output of a digital modulation circuit 18 is supplied to a low pass filter 19 which extracts a low frequency component of the modulated signal, a gain thereof is adjusted to subtract the above low frequency component from a servo error signal and a servo is effected by the servo error signal from which the modulated low frequency component is removed.

Upon recording, a digital signal is supplied to the digital modulation circuit 18 as a raw data in which it is modulated according to a predetermined modulation system. The signal modulated is supplied to the low pass filter 19 and thereby the low frequency component contained in the modulated signal is extracted. The gain of the low frequency component extracted is adjusted by a gain adjusting circuit 20, added to the error signal containing the above mentioned low frequency component which is derived from the servo loop and the low frequency component is subtracted from the error signal. As a result, there is obtained only a true servo error signal the modulated low frequency component of which is removed and thus the servo is effected by this true servo error signal.

BRIEF DESCRIPTION OF DRAWING

The attached drawing is a block diagram showing one embodiment of this invention.

BEST MODE FOR CARRYING OUT THE INVENTION

One embodiment of this invention, applied to an optical magnetic recording and reproducing apparatus, by way of example, will hereinafter be described in detail with reference to the attached drawing.

Reference numeral 1 designates a disc, 2 a winding for generating recording and erasing auxiliary magnetic fields, 3 a lens support member, 4 an objective lens attached to one side of the lens support member in opposing relation to the disc 1, 5 a focusing/tracking actuator, 6 a half mirror, 7 a grating, 8 a beam correcting prism, 9 a collimator lens, and 10 a laser diode. The beam from the laser diode 10 is collimated as a parallel beam by the collimator lens 9, corrected for beam-shape by the beam correction prism 8 and projected onto the disc 1 through the grating 7, the half mirror 6 and the objective lens 4.

Another half mirror 11 is provided for the half mirror 6. For the half mirror 11, there are provided an analyzer 12 and a photo detector 13 to detect a recorded signal. While, for the half mirror 11, there are provided a spacing lens 14 for correcting a magnification, a cylindrical lens 15 for convergent and a photo detector 16 to thereby detect a tracking error signal.

There is provided a laser driving circuit 17 which is used to drive the laser diode 10 upon recording. At the input side of the laser driving circuit 17, provided is the digital modulating circuit 18. The digital modulating circuit 18 is supplied with a digital signal not yet modulated as a raw data, in which the raw data is modulated on the basis of a predetermined modulation system so as to become a channel modulation code. This channel modulation code is converted to a drive current by the laser driving circuit 17 and then supplied to the laser diode 10. The laser diode 10 is turned on when the channel modulation code is "H" and turned off when it is "L". The on and off modulated laser light emitted from the laser diode 10 is traveled through the above mentioned optical path and converged on the face of the disc 1 by the objective lens 4 and thereby recorded in an optical magnetic recording fashion. Accordingly, a light source of the light inputted to the photo detector 16 which detects the tracking error signal is the laser light modulated as mentioned above so that the tracking error signal contains the large low frequency component dependent on the modulation system. employed by the digital modulation circuit 18.

At the output side of the digital modulation circuit 18, there is provided the low pass filter 19 whose pass band is equivalent to the servo band. By this low pass filter, extracted is the low frequency component contained in the modulated signal. The low frequency component extracted is adjusted in gain by the gain adjusting circuit 20, inverted in polarity and then supplied to one input terminal of an adder 21. To the other input terminal of this adder 21, there is supplied the tracking error signal from the photo detector 16. This tracking error signal contains the low frequency component of the modulated signal but if it is supplied to the adder 21 and then added with the low frequency component derived from the gain adjusting circuit 20, the low frequency component of the modulated signal contained therein is removed. Thus, only the true tracking error signal is generated at the output side of the adder 21. In other words, of the digital modulation components, the low frequency component affecting the servo is removed and the tracking error signal becomes the inherent and accurate tracking error signal.

This tracking error signal is supplied through a servo circuit 22 to a tracking winding which forms the actuator 5 whereby the objective lens is moved in the radial direction of the disc, thus the accurate tracking servo being carried out.

While in the above the tracking servo system is described for simplicity of explanation, from the focusing error signal derived from the photo detector 16, there is removed the low frequency component contained in the modulated signal derived from the digital modulation circuit through the low pass filter and the gain adjusting circuit, to thereby produce the focusing error signal which is supplied through the servo circuit to the focusing winding of the actuator 5 so that the accurate focusing can be carried out.

Upon reproducing mode, the laser diode 10 is driven by a constant current smaller than that upon the recording mode and the circuit section of the digital modulation circuit 18 is not used. Hence, the modulated component is not contained in the laser light anymore. In addition, in the case of optical magnetic recording, the so-called Kerr effect is not accompanied with change of the light amount so that the inherent signal component does not appear on the photo detector 16 for tracking servo, and thus the influence of the modulated component can be neglected.

As described above, according to this embodiment, in either case of the recording and reproducing modes, the servo system of the optical magnetic recording and reproducing apparatus is free from the influence exerted by the low frequency component contained in the digital modulation Accordingly, a modulation system having much low frequency components can be used, the selection range of the modulation system can be widened and the recording density can be increased.

While in the above mentioned embodiment the adder 21 is used to add the tracking error signal containing the low frequency component of the modulated signal from the photo detector 16 with the low frequency component with the polarity inverted from the gain adjusting circuit 20 to thereby remove the low frequency component of the modulated signal, it is alternatively possible that instead of the adder 21, there is used a subtracter to subtract the low frequency component (however, the polarity thereof is not inverted) derived from the gain adjusting circuit 16 from the tracking error signal of the photo detector 16. Further, alternatively, the tracking error signal from the photo detector 16 can be divided by the low frequency component (however, the polarity thereof is not inverted) from the gain adjusting circuit 20 by using a divider instead of the adder 21.

While the above mentioned embodiment is a case of the optical magnetic recording, this invention can also be applied similarly to the disc on which the digital data can be recorded one time.

What is claimed is:

1. An optical disc recording and reproducing apparatus comprising:
    a digital modulating circuit supplied with a digital signal to be recorded;
    means for controlling a laser beam introduced from a laser light source to an optical disc in response to an output of said digital modulating circuit;
    first optical means for introducing the laser beam emitted from said laser light source to said optical disc;
    second optical means for introducing a laser beam returned from said optical disc to a photo detector;
    an actuator supplied with a servo error signal obtained from said photo detector and for adjusting said laser beam relative to said optical disc;
    a low pass filter supplied with the output of said digital modulating circuit; and
    removing means for removing from said servo error signal a low frequency component output signal derived from said low pass filter.

2. An optical disc recording and reproducing apparatus according to claim 1, characterized in that said removing means includes a gain adjusting circuit which adjusts a gain of said low frequency component output signal derived from said low pass filter.

3. An optical disc recording and reproducing apparatus according to claim 2, characterized in that said gain adjusting circuit inverts a polarity of said low frequency component output signal and said low frequency component signal with the polarity inverted is supplied to an adder included in said removing means.

4. An optical disc recording and reproducing apparatus according to claim 1, characterized in that said first optical means comprises apparatus for conducting upolarized light from said laser light source to said optical disc.

5. An optical disc recording and reproducing apparatus according to claim 4, characterized in that said optical disc is an optical magnetic disc.

* * * * *